No. 640,335. Patented Jan. 2, 1900.
W. L. TETER & J. A. HEANY.
ELECTRIC WATER FILTER.
(Application filed May 25, 1899.)
(No Model.) 2 Sheets—Sheet 2.
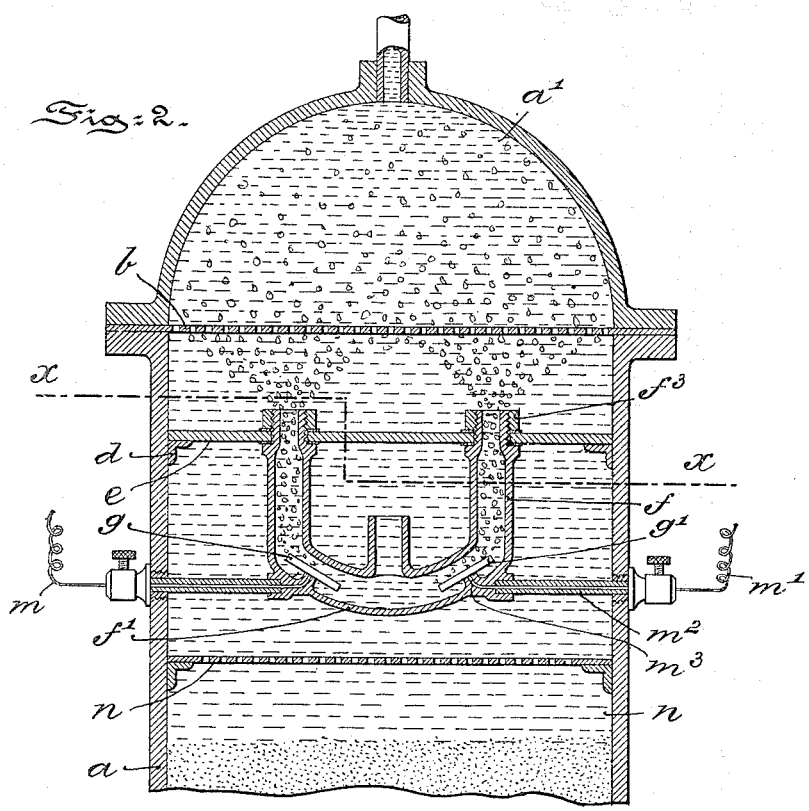
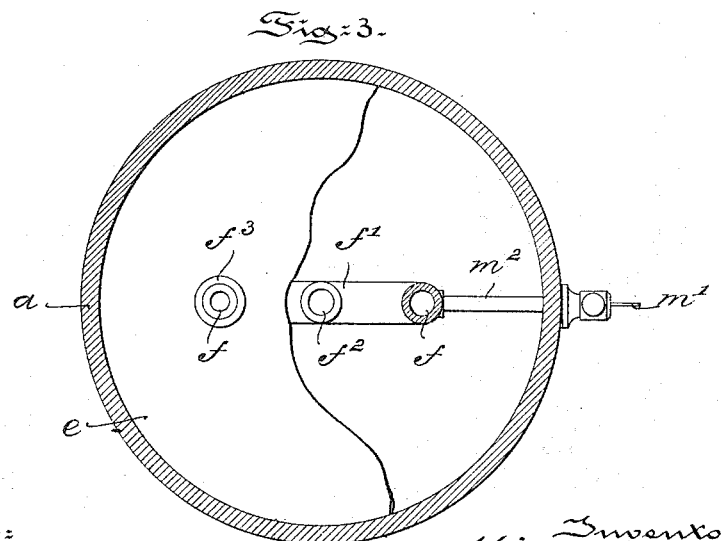

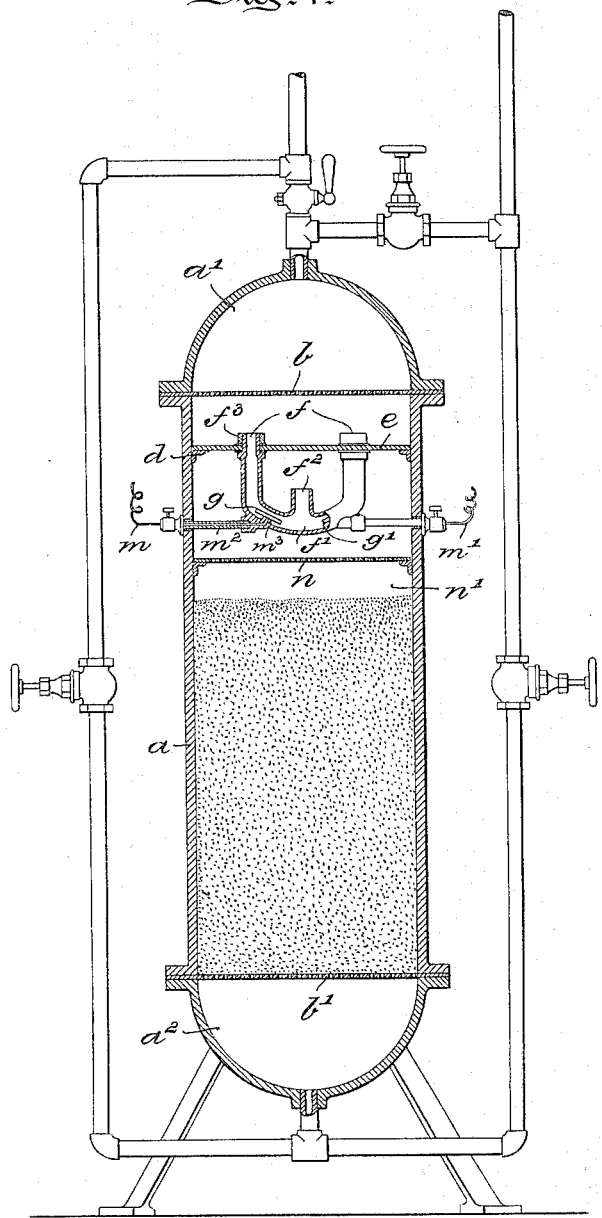

UNITED STATES PATENT OFFICE.

WILLIAM L. TETER AND JOHN A. HEANY, OF PHILADELPHIA, PENNSYLVANIA.

ELECTRIC WATER-FILTER.

SPECIFICATION forming part of Letters Patent No. 640,335, dated January 2, 1900.

Application filed May 25, 1899. Serial No. 718,218. (No model.)

*To all whom it may concern:*

Be it known that we, WILLIAM L. TETER and JOHN A. HEANY, citizens of the United States, residing at the city of Philadelphia, in the county of Philadelphia and State of Pennsylvania, have invented certain new and useful Improvements in Electric Water-Filters, of which the following is a specification.

Our invention has relation to a water-filter wherein prior to the passage of the water to the filtering medium or of the water to a chamber of the apparatus it is electrolyzed by an electric current to disorganize and sterilize the same to kill or remove bacilli or other impurities contained in the water; and in such connection our invention relates to the construction and arrangement of such a filtering apparatus for the said purpose.

The principal object of our invention is to provide a filter of comparatively inexpensive construction, in which bacilli or other similar extraneous matter or impurities are destroyed and the liquid sterilized by the application of a current of electricity to the same prior to its passage through the filtering media or from the apparatus.

Our invention, stated in general terms, consists of an electric water-filter constructed and arranged in substantially the manner hereinafter described and claimed.

The nature and scope of our invention will be more fully understood from the following description, taken in connection with the accompanying drawings, forming part hereof, in which—

Figure 1 is a view, partly in vertical central section and partly in elevation, of a filter embodying the main features of our invention. Fig. 2 is an enlarged sectional view of means for electrolyzing the water, and Fig. 3 is a horizontal sectional view on the line $x\ x$ of Fig. 2.

Referring to the drawings, $a$ represents the substantially cylindrical casing of a filter having a dome-shaped inlet-chamber $a'$ and a similar outlet-chamber $a^2$. The main body of the filter is separated from the chambers $a'$ and $a^2$ by screen-plates $b$ and $b'$. Beneath the upper of these screen-plates $b$ and on the interior of the casing $a$ is provided an annular ledge $d$, upon which is supported a disk $e$ of porcelain or other similar dielectric material. The disk $e$ is traversed by the open-ended legs $ff$ of a eudiometer-tube $f'$ and forms the support for such tube. The eudiometer-tube $f'$ has also midway between the legs $ff$ an outlet-tube $f^2$, arranged below the disk $e$. Into the body of the tube $f'$ is adapted to be inserted the platinum or similar electrodes $g$ and $g'$, each of which is suitably connected by a wire $m$ or $m'$ with the poles of a source of electricity. The wires $m$ and $m'$ traverse the casing $a$ and are incased by a tube $m^2$ of insulating material. The wires also enter the eudiometer-tube $f'$ through suitably-arranged openings $m^3$ on the body of the tube $f'$. Below the tube $f'$ is arranged a screen-plate $n$, separating the tube $f'$ from the compartment $n'$, adapted to contain the filtering media. The eudiometer-tube $f'$ may be made of glass, porcelain, or other dielectric material and is supported from the disk $e$ by means of the collars $f^3$, secured upon the legs $ff$ of the said tube $f'$.

The arrangement above described is such that water entering the inlet-chamber $a'$ first passes through the screen-plate $b$ and is thereafter prevented by the disk $e$ from entering the filter-chamber $n'$. The water, however, enters the eudiometer-tube $f'$ through the legs $ff$ and is subjected to the action of an electric current passing between the electrodes $g$ and $g'$ before it escapes from the central tube $f^2$. As a result of the action of the current the water is partially decomposed, hydrogen gas being evolved through one leg $f$ of the eudiometer $f'$ and oxygen gas through the other leg. There is also generated ozone in sufficient quantity to insure in its passage through the water in the inlet-chamber $a'$ the destruction of bacilli and other germ phases of animate life. After the water is subjected to the electric current it flows out of the tube $f^2$, through the screen-plate $n$, and then into and through preferably the filtering media to the outlet-chamber $a^2$ for being utilized.

Having thus described the nature and objects of our invention, what we claim as new, and desire to secure by Letters Patent, is—

1. In an electric filter, an inlet-chamber, a eudiometer, the open-ended legs of which form the outlets from the inlet-chamber, two electrodes arranged within the eudiometer and respectively connected with the poles of a source of electric energy and an outlet from said eudiometer communicating with the interior of the filter below the inlet-chamber, substantially as and for the purposes described.

2. In an electric filter, an inlet-chamber, a filtering-chamber, a disk separating the inlet from the filtering-chamber, a eudiometer-tube supported by the disk and having two open-ended legs projecting through the disk into the inlet-chamber, two electrodes arranged within the eudiometer-tube and respectively connected with the poles of a source of electric energy and an outlet-tube from the eudiometer-tube below said disk, substantially as and for the purposes described.

In testimony whereof we have hereunto set our signatures in the presence of two subscribing witnesses.

WILLIAM L. TETER.
JOHN A. HEANY.

Witnesses:
J. WALTER DOUGLASS,
THOMAS M. SMITH.